(12) United States Patent
Kawase et al.

(10) Patent No.: US 11,670,784 B2
(45) Date of Patent: Jun. 6, 2023

(54) GAS SUPPLY SYSTEM

(71) Applicant: HONDA MOTOR CO., LTD., Tokyo (JP)

(72) Inventors: Satoru Kawase, Wako (JP); Kazuyuki Kadowaki, Wako (JP); Koichi Takaku, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 202 days.

(21) Appl. No.: 17/338,959

(22) Filed: Jun. 4, 2021

(65) Prior Publication Data

US 2021/0384533 A1 Dec. 9, 2021

(30) Foreign Application Priority Data

Jun. 4, 2020 (JP) .............................. JP2020-097346

(51) Int. Cl.
| | |
|---|---|
| *H01M 8/04082* | (2016.01) |
| *H01M 8/04746* | (2016.01) |
| *H01M 8/0438* | (2016.01) |
| *H01M 8/04089* | (2016.01) |
| *F17C 13/04* | (2006.01) |
| *F17C 7/00* | (2006.01) |
| *F17C 13/02* | (2006.01) |

(52) U.S. Cl.
CPC ... *H01M 8/04201* (2013.01); *H01M 8/04388* (2013.01); *H01M 8/04753* (2013.01); *F17C 7/00* (2013.01); *F17C 13/025* (2013.01); *F17C 13/04* (2013.01); *F17C 2270/0184* (2013.01); *H01M 8/04089* (2013.01); *H01M 8/04097* (2013.01); *H01M 8/04104* (2013.01); *H01M 8/04395* (2013.01); *H01M 2250/20* (2013.01); *Y02E 60/50* (2013.01); *Y02T 90/40* (2013.01)

(58) Field of Classification Search
CPC ......... H01M 8/04201; H01M 8/04388; H01M 8/04753; H01M 8/04395; H01M 8/04089; H01M 8/04104; H01M 8/04097; H01M 2250/20; Y02E 60/50; F17C 7/00; F17C 13/025; F17C 13/04; F17C 2270/0184; Y02T 90/40
USPC .................................................. 137/87.03
See application file for complete search history.

(56) References Cited

U.S. PATENT DOCUMENTS 8,563,191 B2 * 10/2013 Katano ............. H01M 8/04753
429/444
9,293,774 B2 * 3/2016 Asano ............... H01M 8/04201
(Continued)

FOREIGN PATENT DOCUMENTS

JP 2010-003527 A 1/2010

*Primary Examiner* — Minh Q Le
(74) *Attorney, Agent, or Firm* — Carrier Shende & Associates, P.C.; Joseph P. Carrier; Fulchand P. Shende (57) ABSTRACT

In a gas supply system of one embodiment, a gas control ECU performs an initial monitoring step of comparing first detection information of a high-pressure sensor to a first threshold value and, after it is determined that the first detection information has become less than or equal to the first threshold value, performs a secondary monitoring step of comparing second detection information of a mid-pressure sensor to a second threshold value. The gas control ECU causes a valve-open period and a valve-closed period of an injector in the secondary monitoring step to be longer than the valve-open period and the valve-closed period of the injector in the initial monitoring step.

8 Claims, 8 Drawing Sheets

(56) References Cited

U.S. PATENT DOCUMENTS

| | | | | |
|---|---|---|---|---|
| 11,566,754 B2* | 1/2023 | Kadowaki | ............ | F17C 13/025 |
| 2007/0231625 A1* | 10/2007 | Okumi | ............ | H01M 8/04104 |
| | | | | 429/513 |
| 2009/0053567 A1* | 2/2009 | Katano | ............ | H01M 8/04388 |
| | | | | 429/436 |
| 2010/0151343 A1* | 6/2010 | Katano | ............ | H01M 8/04686 |
| | | | | 429/444 |
| 2010/0323252 A1* | 12/2010 | Kobayashi | ........ | H01M 8/04425 |
| | | | | 429/415 |
| 2013/0071767 A1* | 3/2013 | Katano | ............ | H01M 8/04097 |
| | | | | 429/444 |
| 2013/0133759 A1* | 5/2013 | Kato | .................... | H01M 8/2457 |
| | | | | 137/488 |
| 2016/0133966 A1* | 5/2016 | Komiya | ............ | H01M 8/04223 |
| | | | | 429/429 |
| 2018/0175417 A1* | 6/2018 | Jung | ................ | H01M 8/04089 |
| 2018/0233755 A1* | 8/2018 | Saito | .................... | H01M 8/043 |
| 2018/0294496 A1* | 10/2018 | Takeda | ............. | H01M 8/04373 |
| 2018/0331375 A1* | 11/2018 | Egawa | .............. | H01M 8/04104 |
| 2018/0366753 A1* | 12/2018 | Okuyoshi | ......... | H01M 8/1007 |
| 2019/0273272 A1* | 9/2019 | Namba | ........... | H01M 8/04089 |
| 2021/0119232 A1* | 4/2021 | Hamachi | .......... | H01M 8/04097 |
| 2021/0265646 A1* | 8/2021 | Inoue | .............. | H01M 8/04664 |
| 2021/0384533 A1* | 12/2021 | Kawase | ............ | H01M 8/04201 |

* cited by examiner

GAS SUPPLY SYSTEM

CROSS-REFERENCE TO RELATED APPLICATION

This application is based upon and claims the benefit of priority from Japanese Patent Application No. 2020-097346 filed on Jun. 4, 2020, the contents of which are incorporated herein by reference.

BACKGROUND OF THE INVENTION

Field of the Invention

The present invention relates to a gas supply system that supplies gas contained inside a high-pressure tank.

Description of the Related Art

A gas supply system is used in a fuel cell system disclosed in JP 2010-003527 A, for example, as an apparatus for supplying fuel gas (hydrogen gas or anode gas: compressible fluid) in a high-pressure tank. The fuel gas in the high-pressure tank is supplied to a fuel cell stack through a gas supply path including a regulator and an injector therein. The regulator reduces the pressure of the fuel gas on the upstream (high-pressure tank) side and causes this fuel gas to flow to the downstream (fuel cell stack) side. The injector is provided on the downstream side of the regulator, and adjusts the supply amount of the fuel gas by opening and closing a valve therein.

Furthermore, the system disclosed in JP 2010-003527 A includes a high-pressure sensor (first pressure sensor) that detects the pressure inside the high-pressure tank, and a mid-pressure sensor (second pressure sensor) that detects the pressure between the regulator and the injector. The high-pressure sensor has a large error range due to having a wide pressure detection range, while the mid-pressure sensor has a small error range due to having a narrower pressure detection range than the high-pressure sensor. Therefore, when the pressure in the high-pressure tank becomes low, the system determines a lack of the fuel gas in the high-pressure tank by switching from pressure monitoring using the high-pressure sensor to pressure monitoring using the mid-pressure sensor.

SUMMARY OF THE INVENTION

The mid-pressure sensor of the gas supply system detects detection information including a pressure adjustment range in the error range, at a stage when the pressure of the fuel gas in the high-pressure tank is within or above the pressure adjustment range of the regulator. Therefore, if a threshold value for the lack of gas in the high-pressure tank is set within the pressure adjustment range of the regulator, the gas supply system experiences a problem that the error becomes large even when the mid-pressure sensor is used, and the monitoring accuracy for the pressure in the high-pressure tank is reduced.

Alternatively, it is conceivable to set the pressure adjustment range of the regulator in advance to be higher than the lack-of-gas threshold value of the mid-pressure sensor, so that the pressure adjustment range is not included in the error range. However, in such a case, it becomes necessary to increase the pressure resistance capabilities of a device on the downstream side of the regulator, and if the pressure resistance capabilities of this device were to be increased, the weight and cost would be increased significantly.

The present invention takes the above problems into consideration, and has the object of providing a gas supply system that can promote a reduction in the weight and cost while increasing the detection accuracy of a pressure sensor by causing an injector to operate suitably according to the situation.

In order to achieve the above object, one aspect of the present invention is a gas supply system comprising a high-pressure tank; a regulator configured to reduce pressure of a gas released from the high-pressure tank to be within a pressure adjustment range and cause the gas to flow to a downstream side; an injector that is provided on a downstream side of the regulator and is configured to adjust a flow rate of the gas by repeatedly opening and closing a valve thereof; a first pressure sensor configured to detect the pressure of the gas on an upstream side of the regulator; a second pressure sensor configured to detect the pressure of the gas between the regulator and the injector; and a control section configured to control operation of the injector, wherein the control section is configured to perform an initial monitoring step of comparing first detection information of the first pressure sensor to a first threshold value and, after it is determined that the first detection information has become less than or equal to the first threshold value, to perform a secondary monitoring step of comparing second detection information of the second pressure sensor to a second threshold value, and the control section causes a valve-open period and a valve-closed period of the injector in the secondary monitoring step to be longer than the valve-open period and the valve-closed period of the injector in the initial monitoring step.

By causing the injector to suitably operate according to the situation, the gas supply system described above can promote a reduction in weight and cost, while increasing the detection accuracy of the pressure sensor.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of the present invention will be presented and described below with reference to the accompanying drawings.

Figure 1:
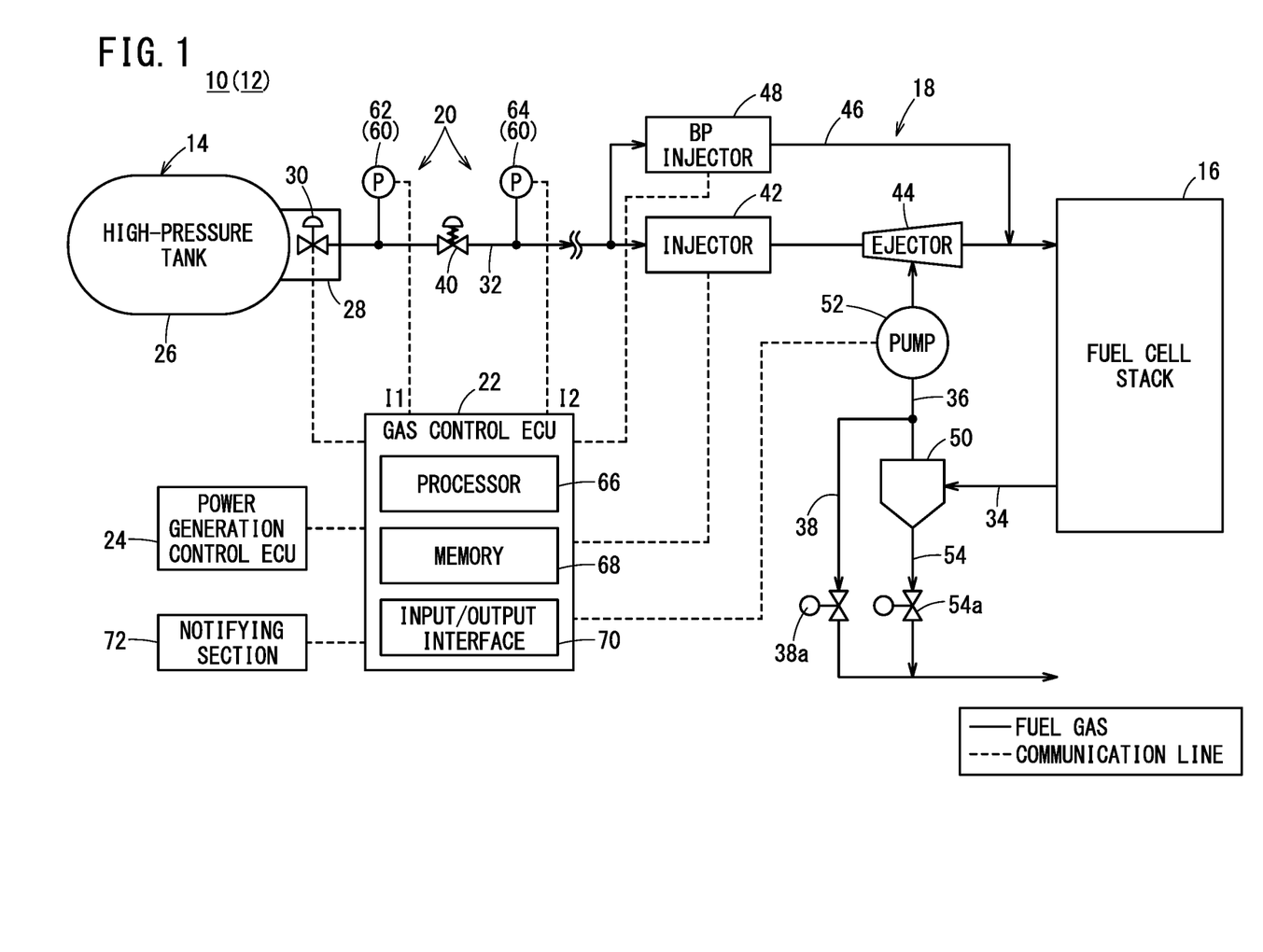
FIG. 1 is a descriptive diagram showing an overall configuration of a gas supply system according to one embodiment of the present invention.

As shown in FIG. 1, a gas supply system 10 according to one embodiment of the present invention is used in a fuel cell system 12, as a fuel gas system apparatus that supplies fuel gas (hydrogen gas or anode gas) that is a compressible fluid. This gas supply system 10 includes a high-pressure tank 14 capable of storing and releasing the fuel gas, and supplies the fuel gas from the high-pressure tank 14 to a fuel cell stack 16. The fuel cell stack 16 generates power by an electrochemical reaction between the fuel gas supplied by the gas supply system 10 and an oxygen-containing gas (air or cathode gas) supplied by an oxygen-containing gas system apparatus (not shown in the drawings).

The fuel cell system 12 is mounted in a fuel cell vehicle (not shown in the drawings), for example, and supplies electrical equipment such as a motor and a battery with the power generated by the fuel cell stack 16. The fuel cell system 12 (gas supply system 10) is not limited to being adopted in a fuel cell vehicle, and may be formed to be stationary, for example.

The gas supply system 10 includes, in addition to the high-pressure tank 14 described above, a gas flow portion 18 that allows the fuel gas to flow between the high-pressure tank 14 and the fuel cell stack 16, and a sensor group 20 provided in the gas flow portion 18. Furthermore, the gas supply system 10 includes a gas control ECU (Electronic Control Unit) 22 that controls various devices for causing the fuel gas to flow in the high-pressure tank 14 and the gas flow portion 18. The gas control ECU 22 controls the flow state of the fuel gas based on a request command for the fuel gas from a power generation control ECU 24 that controls the power generation of the fuel cell system 12. The gas control ECU 22 may be provided integrally with the power generation control ECU 24.

The high-pressure tank 14 includes a container body 26 formed by a liner and a reinforcement layer (CFRP) (not shown in the drawings), for storing the high-pressure fuel gas, and a cap (not shown in the drawings) for releasing the fuel gas from the container body 26 into the gas flow portion 18. A connector 28 for connecting the high-pressure tank 14 and the gas flow portion 18 is attached to the cap. This connector 28 includes a main stop valve 30 that switches between releasing and stopping the release of the fuel gas in the high-pressure tank 14.

The main stop valve 30 opens and closes the flow path inside the connector 28, in response to a control signal output from the gas control ECU 22. The fuel gas in the high-pressure tank 14 is released into the gas flow portion 18 when the main stop valve 30 is in the open state, and the release of the fuel gas is cut off when the main stop valve 30 is in the closed state.

The gas flow portion 18 has a flow path allowing the fuel gas to flow, between the high-pressure tank 14 and the fuel cell stack 16. Specifically, the gas flow portion 18 includes a gas supply path 32 that extends from the high-pressure tank 14 to the fuel cell stack 16 and allows the fuel gas to flow therethrough. Furthermore, the gas flow portion 18 includes a gas discharge path 34 through which fuel off gas (unreacted hydrogen gas, nitrogen gas, steam, or the like) is discharged from the fuel cell stack 16, and a gas circulation path 36 that causes the fuel off gas in the gas discharge path 34 to circulate back to the gas supply path 32. Yet further, a purge path 38 for discharging the fuel off gas from the circulation route of the gas flow portion 18 is connected to the gas circulation path 36. The purge path 38 is provided with a purge valve 38a that discharges or stops discharging the fuel off gas.

The gas flow portion 18 includes devices for adjusting the flow state (pressure, flow rate, flow velocity, and the like) of the fuel gas, in the gas supply path 32, the gas discharge path 34, and the gas circulation path 36. Specifically, the gas supply path 32 includes a regulator 40, an injector 42, an ejector 44, and the like in the stated order from the upstream side (high-pressure tank 14 side) toward the downstream side (fuel cell stack 16 side). The gas supply path 32 may be provided with a device such as a heat exchanger (not shown in the drawings), in addition to the above devices. Furthermore, the gas supply system 10 may include the main stop valve 30 in, instead of connector 28, the gas supply path 32 on the upstream side of the regulator 40.

In the gas supply path 32, the high-pressure fuel gas flows into the regulator 40 from the upstream side (primary side: high-pressure tank 14 side), and the regulator 40 depressurizes and emits this fuel gas to the downstream side (secondary side: fuel cell stack 16 side). As an example, the regulator 40 includes a pressure adjustment spring and a valve within a case (none of which are shown in the drawings), and adjusts the pressure of the fuel gas by opening and closing the valve according to the difference between the elastic force of the pressure adjustment spring and the pressure on the downstream side. In FIG. 1, a configuration is shown in which one regulator 40 is provided in the gas supply path 32, but the gas flow portion 18 may be configured to include a plurality of regulators 40 and to reduce the pressure of the fuel gas in a stepped manner toward the downstream side.

The regulator 40 reduces the pressure of the fuel gas to be within a set pressure adjustment range PR (see FIGS. 4A and 4B), and emits the depressurized fuel gas to the gas supply path 32 on the downstream side. In a normal state where a sufficient amount of the fuel gas is stored in the high-pressure tank 14, the regulator 40 depressurizes the fuel gas such that the pressure thereof is in a first pressure adjustment range PR1 (see FIG. 4A) that has a predetermined pressure width (lower limit value of L1 and an upper limit value of H1). The pressure adjustment range PR of the regulator 40 can be changed by adjusting the operation of the injector 42. The control of changing the pressure adjustment range PR is described in detail further below.

A valve of the injector 42 is repeatedly opened and closed, under the control of the gas control ECU 22, to suitably adjust the discharge amount of the fuel gas output to the fuel cell stack 16. In other words, the injector 42 corresponds to a flow state adjusting section that adjusts the flow rate (supply amount) of the fuel gas from the high-pressure tank 14 toward the fuel cell stack 16. Furthermore, the injector 42 further reduces the pressure of the fuel gas on the upstream side of this injector 42 and discharges the depressurized fuel gas to the downstream side. In other words, in the gas supply path 32, high-pressure fuel gas flows from the high-pressure tank 14 to the regulator 40, mid-pressure fuel gas flows from the regulator 40 to the injector 42, and low-pressure fuel gas flows from the injector 42 to the fuel cell stack 16.

The ejector 44, while sucking in fuel off gas from the gas circulation path 36 due to the negative pressure generated by the movement of the fuel gas discharged from the injector 42, supplies this fuel gas to the fuel cell stack 16 on the downstream side.

Furthermore, a bypass supply path 46, which bypasses the injector 42 and the ejector 44, is connected to the gas supply path 32. This bypass supply path 46 is provided with a BP (bypass) injector 48. When high-current power generation by the fuel cell stack 16 is requested, for example, the BP injector 48 increases the discharge amount of the fuel gas up to the request value for the high-current power generation by opening and closing a valve thereof under the control of the gas control ECU 22.

On the other hand, a gas-liquid separator 50 is provided at a boundary portion between the gas discharge path 34 and the gas circulation path 36. The gas-liquid separator 50 separates the liquid (water created during power generation) contained in the fuel off gas from the gas (hydrogen gas, nitrogen gas, and the like). The gas circulation path 36 is connected to the top portion of the gas-liquid separator 50, and causes the fuel off gas from which the liquid has been separated by the gas-liquid separator 50 to flow out. The gas circulation path 36 is provided with a pump 52 that causes the fuel off gas to circulate back to the gas supply path 32.

Furthermore, one end of a drain path 54 for discharging the separated liquid is connected to the bottom portion of the gas-liquid separator 50. The drain path 54 is provided with a drain valve 54a that discharges and cuts off the discharge of the liquid. The other end of the drain path 54 is connected to the purge path 38.

The sensor group 20 of the gas supply system 10 includes a plurality of pressure sensors 60 (high-pressure sensor 62 and mid-pressure sensor 64) that detect the pressure of the fuel gas. Although not shown in the drawings, the sensor group 20 may include a temperature sensor, a flow rate sensor, and the like in addition to the pressure sensors 60.

The high-pressure sensor 62 is a first pressure sensor provided in the gas supply path 32 between the high-pressure tank 14 and the regulator 40. In other words, the high-pressure sensor 62 is configured to be capable of detecting the pressure of the high-pressure fuel gas on the upstream side of the regulator 40. The high-pressure sensor 62 is connected to the gas control ECU 22, and outputs the detected pressure (first detection information) to the gas control ECU 22. The high-pressure sensor 62 may be provided inside the container body 26 of the high-pressure tank 14.

The mid-pressure sensor 64 is a second pressure sensor provided between the regulator 40 and the injector 42 (on the upstream side of the location where the bypass supply path 46 is connected). In other words, the mid-pressure sensor 64 is configured to be capable of detecting the pressure of the mid-pressure fuel gas that has been depressurized by the regulator 40. The mid-pressure sensor 64 is also connected to the gas control ECU 22, and outputs the detected pressure (second detection information) to the gas control ECU 22.

Figure 2:
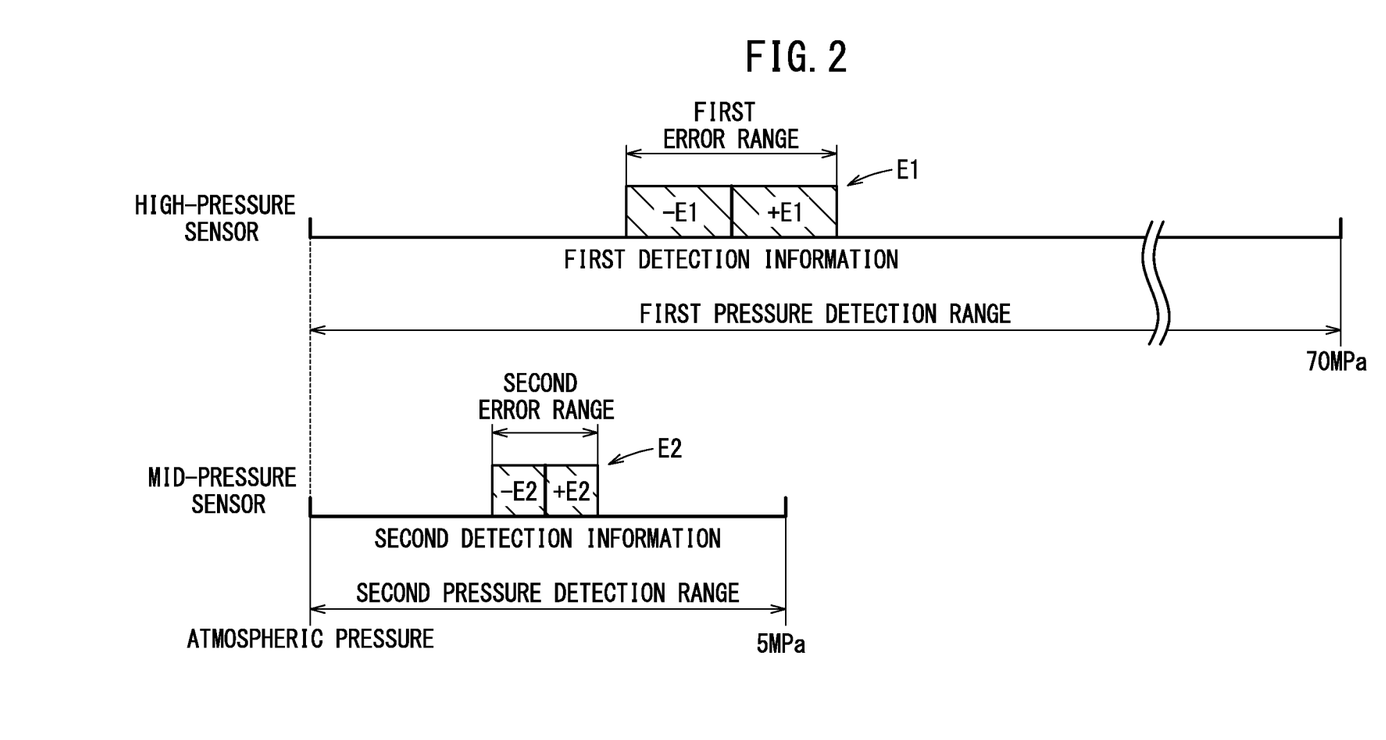
FIG. 2 is a descriptive diagram showing pressure detection ranges and error ranges of a high-pressure sensor and a mid-pressure sensor.

Here, as shown in FIG. 2, the high-pressure sensor 62 includes a wide first pressure detection range for detecting the high-pressure fuel gas, while the mid-pressure sensor 64 has a second pressure detection range, which is narrower than that of the high-pressure sensor 62, for detecting the mid-pressure fuel gas. Although it depends on the pressure resistance capabilities of the high-pressure tank 14, the first pressure detection range of the high-pressure sensor 62 is set in an approximate range from atmospheric pressure to 70 MPa, for example. Although it depends on the depressurization capability of the regulator 40, the second pressure detection range of the mid-pressure sensor 64 is set in an approximate range from atmospheric pressure to 5 MPa, for example.

When the pressure of the fuel gas inside the high-pressure tank 14 is less than or equal to a prescribed tank protection pressure GP (see FIGS. 4A to 4C), there is a higher possibility of the high-pressure tank 14 being damaged, for example. Furthermore, due to the valve of the regulator 40 not opening at the prescribed tank protection pressure GP, it becomes impossible for the mid-pressure sensor 64 to determine the lack of gas.

Since the high-pressure sensor 62 and the mid-pressure sensor 64 differ from each other with respect to the pressure detection ranges as described above, the error ranges occurring in the pressure detection also differ. That is, the high-pressure sensor 62 detects pressure with a first error range E1 that is relatively wide. As an example, the first error range E1 has a positive component of +E1 and a negative component of −E1 (see FIG. 4A).

On the other hand, the mid-pressure sensor 64 detects pressure with a second error range E2, which is narrower than the first error range E1. That is, the second error range E2 has a positive component (+E2) that is smaller than +E1 and a negative component (−E2) that is smaller than −E1 (see FIG. 4B). It should be noted that, in the normal state where a sufficient amount of fuel gas is stored in the high-pressure tank 14, the pressure adjustment range PR of the regulator 40 is the predetermined first pressure adjustment range PR1, as described above. Therefore, in the normal state, the mid-pressure sensor 64 detects the pressure of the fuel gas on the downstream side of the regulator 40 with an error range obtained by adding the first pressure adjustment range PR1 to the second error range E2.

Returning to FIG. 1, the gas control ECU 22 is formed by a computer including a processor 66, a memory 68, and an input/output interface 70, and is connected in a communicable manner to each device of the gas supply system 10, the sensor group 20, and a notifying section 72. The notifying section 72 is a device that notifies a user of the gas supply system 10 about the state of the fuel gas in the high-pressure tank 14, and may be an indicator, monitor, or speaker provided in the fuel cell vehicle, for example.

Figure 3:
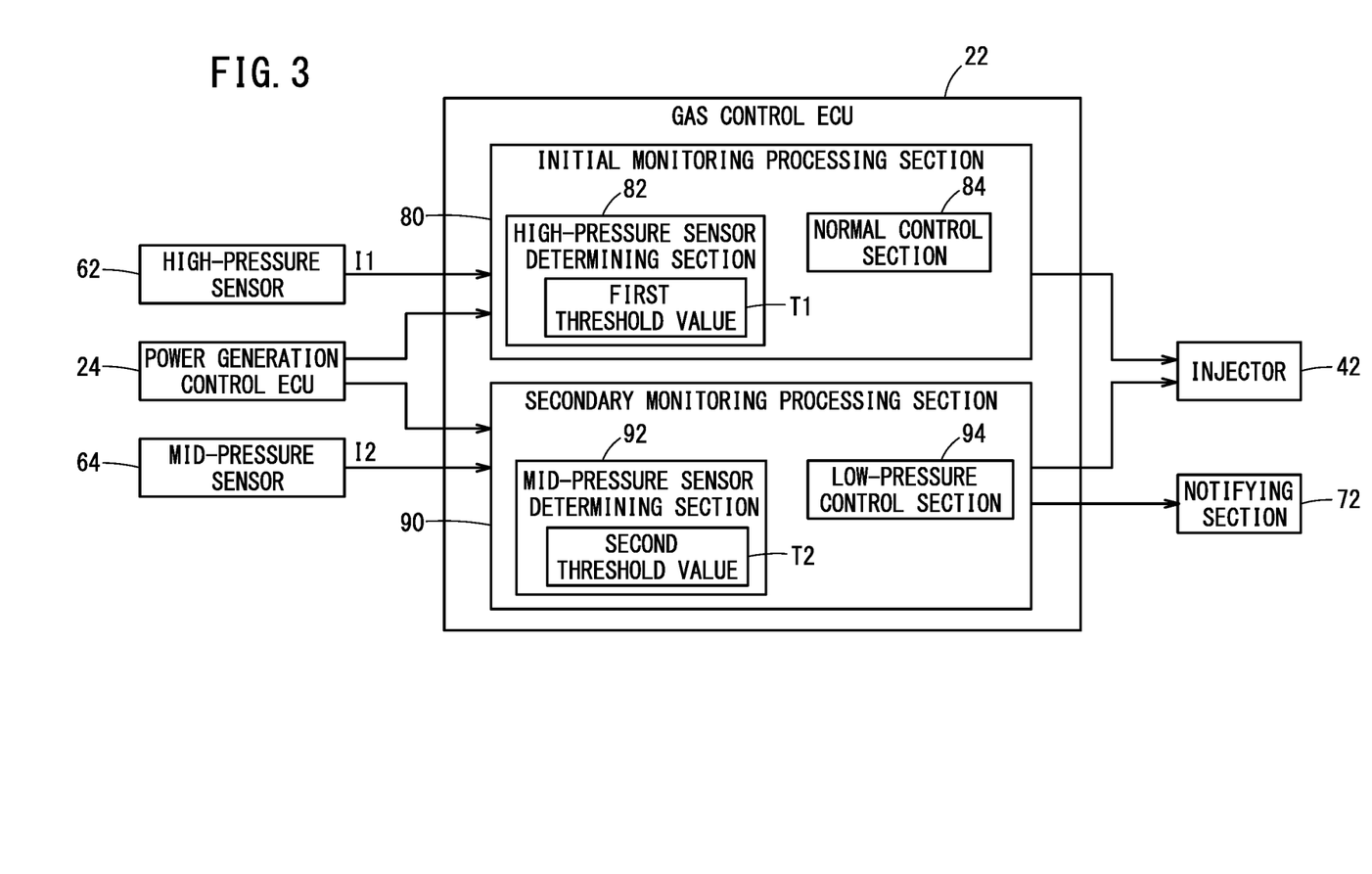
FIG. 3 is a block diagram showing functions of a gas control ECU.

The gas control ECU 22 creates function blocks for controlling the flow state of the fuel gas, as shown in FIG. 3, by having the processor 66 execute a program (not shown in the drawings) stored in the memory 68. Furthermore, when the fuel gas is being supplied, the gas control ECU 22 performs the determination concerning lack of gas inside the high-pressure tank 14 in two stages, respectively using the detection signal of the high-pressure sensor 62 (first detection information I1) and the detection signal of the mid-pressure sensor 64 (second detection information I2). For this purpose, an initial monitoring processing section 80 and a secondary monitoring processing section 90 are created in the gas control ECU 22.

The initial monitoring processing section 80 is a function section that operates when there is enough fuel gas remaining in the high-pressure tank 14 and the pressure of the high-pressure tank 14 is high. A high-pressure sensor determining section 82 and a normal control section 84 are provided in this initial monitoring processing section 80.

Figure 4A:
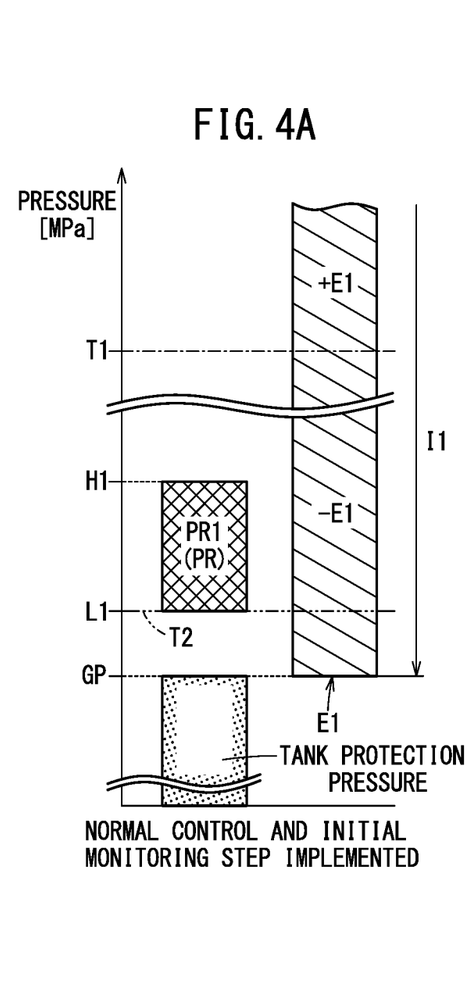
FIG. 4A is a graph for describing the pressure adjustment range in an initial monitoring step and a first error range of the high-pressure sensor.

During normal control (operation of the normal control section 84), the high-pressure sensor determining section 82 receives the first detection information I1 of the high-pressure sensor 62 and performs an initial monitoring step of determining the remaining amount of fuel gas in the high-pressure tank 14. Therefore, the high-pressure sensor determining section 82 holds in advance a first threshold value T1 to be compared to the first detection information I1. The first threshold value T1 is preferably set to be as low as possible based on the protection pressure of the high-pressure tank 14, the first error range E1 of the high-pressure sensor 62, and the like. For example, as shown in FIG. 4A, the first threshold value T1 may be set to a value obtained by adding together the tank protection pressure GP of the high-pressure tank 14 and the absolute value of the negative component (−E1) of the first error range E1 of the high-pressure sensor 62.

Figure 5A:
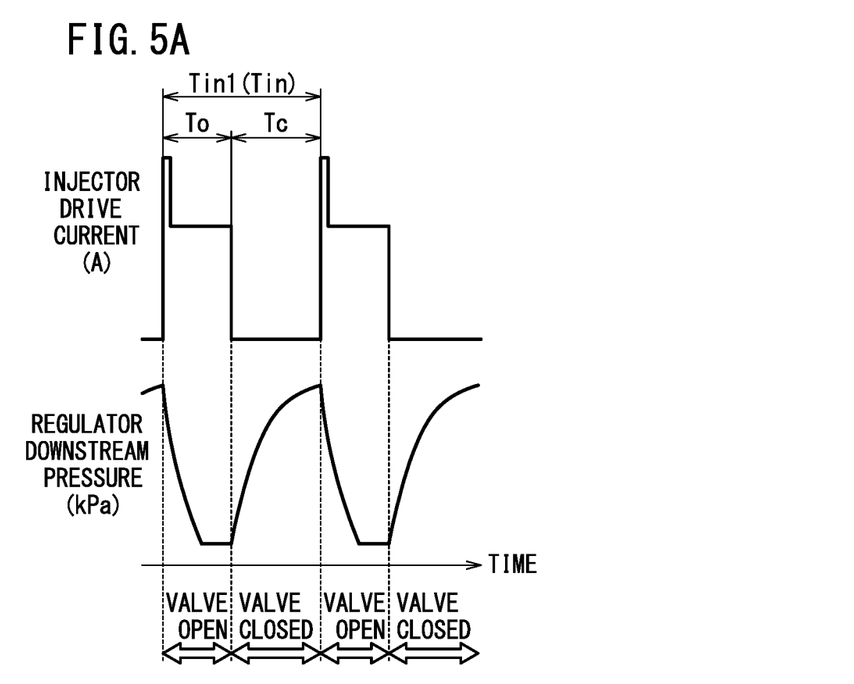
FIG. 5A is a graph showing the operation of the injector during normal control and a change in pressure between the regulator and the injector.

Returning to FIG. 3, the normal control section 84 operates in a state where the pressure in the high-pressure tank 14 is high to implement the normal control. At this time, the normal control section 84 calculates a target supply amount for the fuel gas, based on the request command of the power generation control ECU 24, and also opens the main stop valve 30 and causes the injector 42 to operate according to a duty ratio corresponding to the target supply amount. With the control of the injector 42, a drive command is output to a power distribution section (not shown in the drawings) connected to a power source, and a drive current (pulse current) with a waveform such as shown in FIG. 5A is supplied from the power distribution section to a drive circuit (not shown in the drawings) of the injector 42.

Specifically, the drive current exhibits a high inrush current when the valve of the injector 42 is first opened, then comes to have a current value (stable current) needed to open the valve, and then decreases from this stable current to become a zero current, thereby closing the valve of the injector 42. In this case, the time period of the inrush current and stable current is a valve-open period To, and the time period of the zero current is a valve-closed period Tc. Furthermore, in the present embodiment, the time period in which the opening and closing of the valve is performed once is referred to as the drive interval Tin (=valve-open period To+valve-closed period Tc). The duty ratio of the injector 42 for the valve-open period To and the valve-closed period Tc can be calculated as DUTY=To/Tin. The injector 42 repeatedly opens and closes the valve thereof based on the drive current having the duty ratio according to the command from the normal control section 84, thereby adjusting the supply amount of the fuel gas.

The fuel gas pressure in the gas supply path 32 between the regulator 40 and the injector 42 (also referred to below as the regulator downstream pressure) changes due to the effect of the operation of the valve opening and closing of the injector 42. That is, since the injector 42 causes the fuel gas to flow to the downstream side by opening the valve, the regulator downstream pressure drops suddenly. Furthermore, after dropping to a prescribed pressure, the regulator downstream pressure then stays at this prescribed pressure during the following valve-open period To. On the other hand, the injector 42 cuts off the flow of the fuel gas to the downstream side by closing the valve. Therefore, the regulator downstream pressure exhibits a time-constant waveform that rises suddenly when the valve is first opened and then rises gradually up to the shutoff pressure of the regulator 40.

However, the gas control ECU 22 does not use the pressure waveform detected by the mid-pressure sensor 64 as-is, and instead calculates a moving average value MAD (see FIG. 6) of the continuous pressure waveform. Due to this, the gas control ECU 22 recognizes the average fluctuation of the regulator downstream pressure and uses this average fluctuation (moving average value MAD) in the processing such as the lack-of-gas determination.

Returning to FIG. 3, the secondary monitoring processing section 90 operates after it has been determined in the initial monitoring step that the first detection information I1 of the high-pressure sensor 62 is less than or equal to the first threshold value T1. A mid-pressure sensor determining section 92 and a low-pressure control section 94 are provided in this secondary monitoring processing section 90.

During the low-pressure control (operation of the low-pressure control section 94), the mid-pressure sensor determining section 92 receives the second detection information I2 of the mid-pressure sensor 64 and performs a secondary monitoring step of determining the remaining amount of fuel gas in the high-pressure tank 14. That is, the gas supply system 10 uses the second detection information I2 having the second error range E2 that is narrower than the first error range E1, thereby accurately determining the lack of gas in the high-pressure tank 14.

The mid-pressure sensor determining section 92 holds in advance a second threshold value T2 to be compared to the second detection information I2. If the second detection information I2 is less than or equal to the second threshold value T2, the gas control ECU 22 determines that there is a lack of fuel gas in the high-pressure tank 14 and notifies the user of this fact (lack of fuel gas) via the notifying section 72.

Figure 4B:
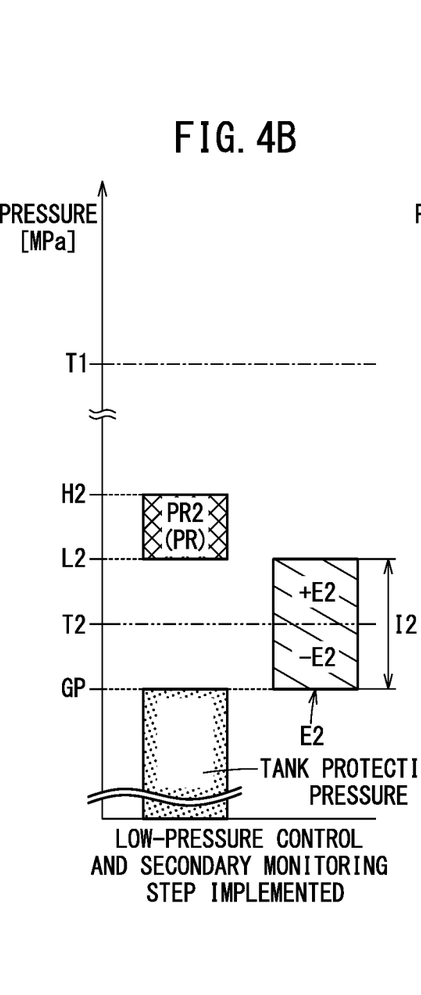
FIG. 4B is a graph for describing the pressure adjustment range in a secondary monitoring step and a second error range of the high-pressure sensor.

This second threshold value T2 is preferably set as low as possible, based on the protection pressure of the high-pressure tank 14, the second error range E2 of the mid-pressure sensor 64, and the like. For example, as shown in FIG. 4B, the second threshold value T2 may be set to be a value obtained by adding together the tank protection pressure GP of the high-pressure tank 14 and the absolute value of the negative component (−E2) of the second error range E2 of the mid-pressure sensor 64.

The following describes the relationship between the second threshold value T2, the second error range E2 of the mid-pressure sensor 64, the pressure adjustment range PR of the regulator 40, and the protection pressure of the high-pressure tank 14 of the gas supply system 10 according to the present embodiment in greater detail.

In the gas supply system 10, if the pressure adjustment range PR, which is the depressurization capability of the regulator 40, is low (close to the protection pressure of the high-pressure tank 14), it is possible to reduce the pressure resistance capabilities of the pipes, devices, and the like on the downstream side of the regulator 40. By decreasing the pressure resistance capabilities of these pipes and devices, it is possible to further promote a reduction in the weight and cost of the gas supply system 10.

Therefore, as shown in FIG. 4A, the gas supply system 10 implements the normal control in the initial monitoring step and, with this normal control, adjusts the flow state of the fuel gas such that the pressure adjustment range PR of the regulator 40 overlaps the second threshold value T2 of the secondary monitoring step. For example, the regulator 40 depressurizes the fuel gas to be in the first pressure adjustment range PR1. Due to this, with the gas supply system 10, it is possible to reduce the pressure resistance capabilities of the pipes, devices, and the like on the downstream side of the regulator 40.

Figure 4C:
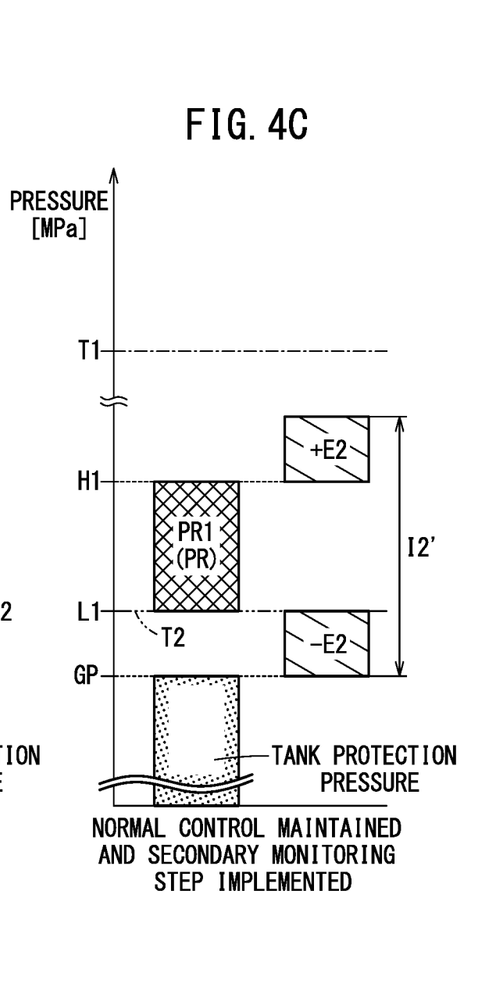
FIG. 4C is a graph for describing the pressure adjustment range in a reference example and the second error range of the mid-pressure sensor.

Here, FIG. 4C is referenced to consider a case occurring if the first pressure adjustment range PR1 set in the normal control (initial monitoring step) overlaps the second threshold value T2 in the secondary monitoring step as well. In this case, the mid-pressure sensor 64 detects second detection information I2' in which the first pressure adjustment range PR1 of the regulator 40 is added to the second error range E2 (±E2). Here, even though the actual pressure is within the first pressure adjustment range PR1 or greater than the first pressure adjustment range PR1, there is a possibility of this pressure being detected as less than or equal to the second threshold value T2 due to the detection error, which would lead to a determination that there is a lack of gas in this case. In other words, even though the mid-pressure sensor 64 having a smaller error range than the high-pressure sensor 62 is used, the accuracy of the determination concerning the lack of gas in the high-pressure tank 14 is reduced.

Therefore, in the secondary monitoring step, the gas control ECU 22 according to the present embodiment performs processing to offset the pressure adjustment range PR of the regulator 40 from the second threshold value T2 including the positive component (+E2) of the second error range E2, as shown in FIG. 4B. The low-pressure control section 94 of the secondary monitoring processing section 90 adjusts the pressure adjustment range PR of the regulator 40 by changing the operational content of the injector 42.

Figure 5B:
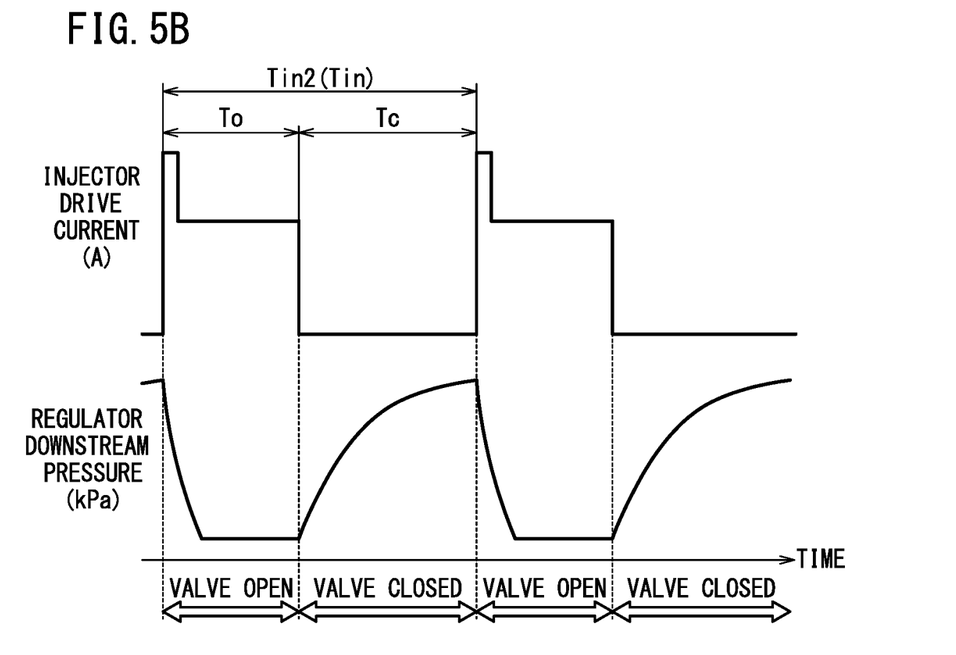
FIG. 5B is a graph showing the operation of the injector during normal control and a change in pressure between the regulator and the injector.
Figure 6:
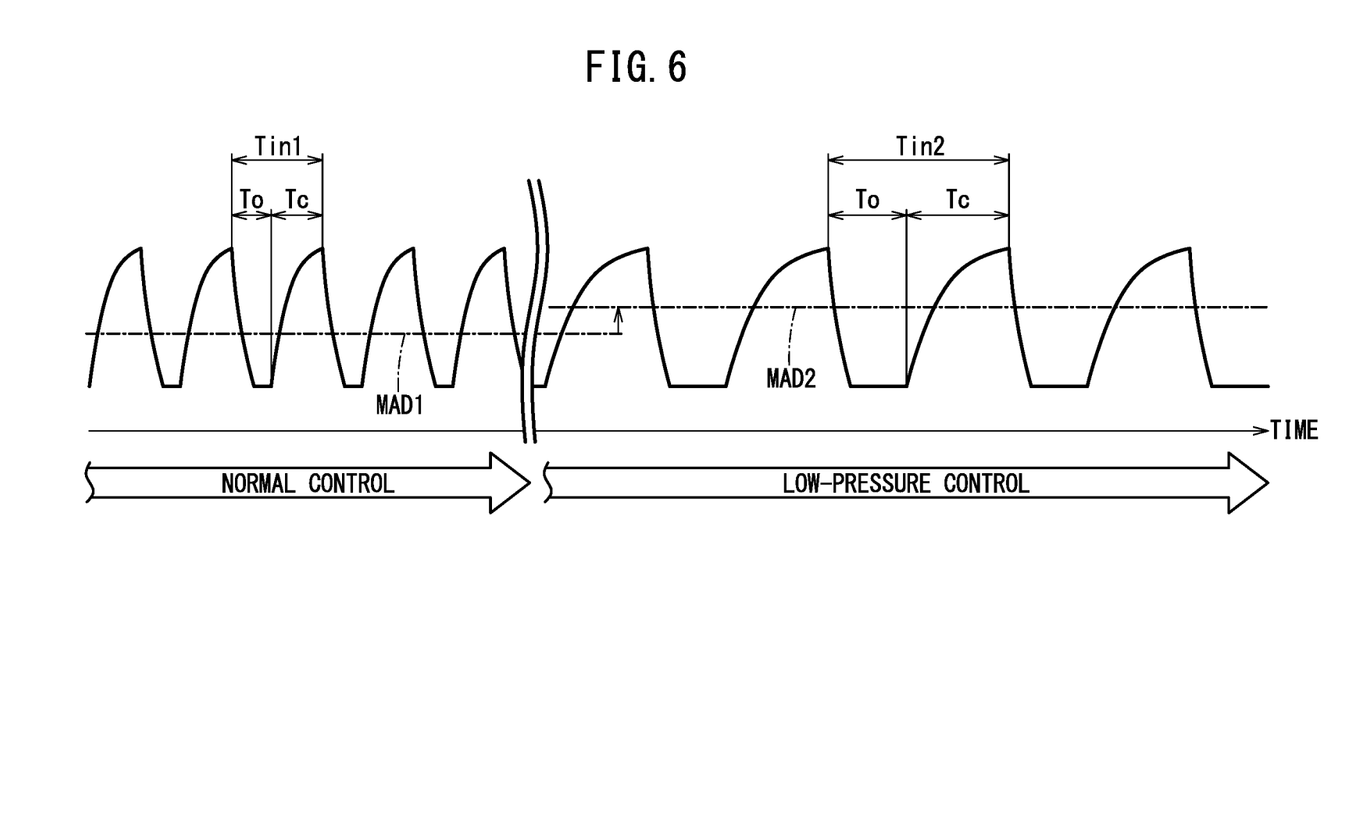
FIG. 6 is a graph showing the fuel gas pressure and moving average value based on the operation of the injector in the initial monitoring step and in the secondary monitoring step.

As shown in detail in FIG. 5B, the low-pressure control section 94 performs an operation (low-pressure control) of extending the drive interval Tin and repeatedly opening and closing the valve, without changing the duty ratio of the injector 42. For example, the low-pressure control section 94 extends the drive interval Tin2 in the low-pressure control in a range of 150% to 200% (1.5 times to 2 times) of the drive interval Tin1 in the normal control. Due to this, the valve-closed period Tc becomes longer and the injector 42 can increase the time during which the regulator downstream pressure increases according to this valve-closed period Tc. As a result, as shown in FIG. 6, the moving average value MAD2 in the low-pressure control is shifted upward relative to the moving average value MAD1 in the normal control.

As shown in FIG. 4B, the low-pressure control section 94 decreases the width of the pressure change on the downstream side of the regulator 40 and increases the lower limit value L2 of the control pressure (second pressure adjustment range PR2) of the regulator 40, by controlling the injector 42. For example, the low-pressure control section 94 extends the drive interval Tin such that the second pressure adjustment range PR2 is narrowed, from the first pressure adjustment range PR1 used in the initial monitoring step, by the positive component of the second error range E2, with the second threshold value T2 as a reference point. Due to this, the mid-pressure sensor determining section 92 can favorably monitor the fuel gas pressure (second information I2 of the mid-pressure sensor 64) near the second threshold value T2 and determine the lack of gas in the high-pressure tank 14.

In particular, in the low-pressure control according to the present embodiment, the duty ratio of the valve-open period To and the valve-closed period Tc is not changed unless the target supply amount of the fuel gas is changed. Therefore, the gas supply system 10 does not significantly reduce the flow rate of the fuel gas discharged to the downstream side of the injector 42. For example, in the normal control and the low-pressure control, the duty ratio may be set to be less than or equal to 50%. Due to this, the gas supply system 10 can change the pressure adjustment range PR of the regulator 40 while preserving the fuel gas supply amount. Since it is possible to increase the fuel gas pressure if the valve-closed period Tc of the injector 42 is long, the gas supply system 10 may set the duty ratio in the low-pressure control in a manner to lengthen the valve-closed period Tc.

The gas supply system 10 according to the present embodiment is basically configured as described above, and the following describes the operation thereof.

The power generation control ECU 24 of the fuel cell system 12 causes the gas supply system 10 to operate, to supply the fuel gas from the high-pressure tank 14 to the fuel cell stack 16. The fuel cell stack 16 performs power generation by the electrochemical reaction between the fuel gas supplied by the gas supply system 10 and the oxygen-containing gas supplied by the oxygen-containing gas system apparatus.

For the supply of the fuel gas, the gas control ECU 22 sets a flow state of the fuel gas based on the detection signal of the sensor group 20, and suitably controls the main stop valve 30, the purge valve 38a, the injector 42, the BP injector 48, the pump 52, and the drain valve 54a. Furthermore, while the fuel gas is being supplied, the gas control ECU 22 monitors the remaining amount of fuel gas in the high-pressure tank 14 based on the detection signal (first detection information I1) of the high-pressure sensor 62 and the detection signal (second detection information I2) of the mid-pressure sensor 64. Specifically, the gas control ECU 22 implements a processing flow of the lack-of-gas determination method shown in FIG. 7.

In the lack-of-gas determination method, the gas control ECU 22 first implements the initial monitoring step. At this time, the normal control section 84 implements the normal control of opening and closing the valve of the injector 42 according to the duty ratio that is based on the target supply amount of the fuel cell gas, while opening the main stop valve 30 (step S1). Specifically, the waveform of the regulator downstream pressure in the normal control shown in FIGS. 5A and 6 has a time span that changes according to the duty ratio. Therefore, the moving average value MAD1 of the regulator downstream pressure in the normal control decreases as the duty ratio becomes larger, and increases as the duty ratio becomes smaller. Furthermore, as shown in FIG. 4A, in the normal control, the regulator 40 reduces the pressure of the fuel gas on the upstream side to be in the first pressure adjustment range PR1, and outputs this depressurized fuel gas to the downstream side.

Returning to FIG. 7, the high-pressure sensor determining section 82 reads the first threshold value T1 stored in advance in the memory 68, in order to monitor the first detection information I1 of the high-pressure sensor 62 (step S2). Then, the high-pressure sensor determining section 82 acquires the first detection information I1 from the high-pressure sensor 62 (step S3), and determines whether this first detection information I1 is less than or equal to the first threshold value T1 (step S4). If the first detection information I1 exceeds the first threshold value T1 (step S4: NO), the process returns to step S3 and similar processing is then repeated. On the other hand, if the first detection information I1 is less than or equal to the first threshold value T1 (step S4: YES), the process moves to step S5.

At step S5, the gas control ECU 22 switches from the normal control to the low-pressure control. In the low-pressure control shown in FIGS. 5B and 6, with the main stop valve 30 in the open state, the low-pressure control section 94 extends the drive interval Tin2 for opening and closing the valve of the injector 42 to be longer than the drive interval Tin1 in the normal control. Furthermore, at this time, if the target supply amount of the fuel gas is constant, the duty ratio of the valve-open period To and the valve-closed period Tc does not change.

The injector 42 opens and closes the valve thereof with a valve-open period To and a valve-closed period Tc that are longer than in the normal control, thereby increasing the time span of the amplitude of the regulator downstream pressure to be longer than the time span thereof in the normal control. Accordingly, the moving average value MAD2 in the low-pressure control increases more than the moving average value MAD1 in the normal control. Due to this operation of the injector 42, the regulator 40 reduces the pressure of the fuel gas on the upstream side to be in the second pressure adjustment range PR2, as shown in FIG. 4B, and outputs the depressurized fuel gas to the downstream side.

Returning to FIG. 7, the mid-pressure sensor determining section 92 reads the second threshold value T2 from the memory 68 (step S6). Then, the mid-pressure sensor determining section 92 acquires the second detection information I2 from the mid-pressure sensor 64 (step S7), and determines whether this second detection information I2 is less than or equal to the second threshold value T2 (step S8).

As described above, the pressure adjustment range PR of the regulator 40 is changed to the second pressure adjustment range PR2, which is from the lower limit value L2 to the upper limit value H2, due to the low-pressure control (extending of the drive interval Tin of the injector 42) (see FIG. 4B as well). The lower limit value L2 of this second pressure adjustment range PR2 does not overlap the second threshold value T2, and is greater than or equal to a value obtained by adding the positive component (+E2) of the second error range E2 to the second threshold value T2. Accordingly, in a case where the fuel gas pressure has dropped to near the second threshold value T2, even if the mid-pressure sensor 64 were to detect the second detection information I2 including the second error range E2, the second detection information I2 would not be a value having the second pressure adjustment range PR2 of the regulator 40 added thereto. In other words, the mid-pressure sensor 64 can accurately detect the reduced fuel gas pressure near the second threshold value T2. By comparing this second detection information I2 detected by the mid-pressure sensor 64 to the second threshold value T2, the gas control ECU 22 can correctly recognize a lack of gas in the high-pressure tank 14.

Figure 7:
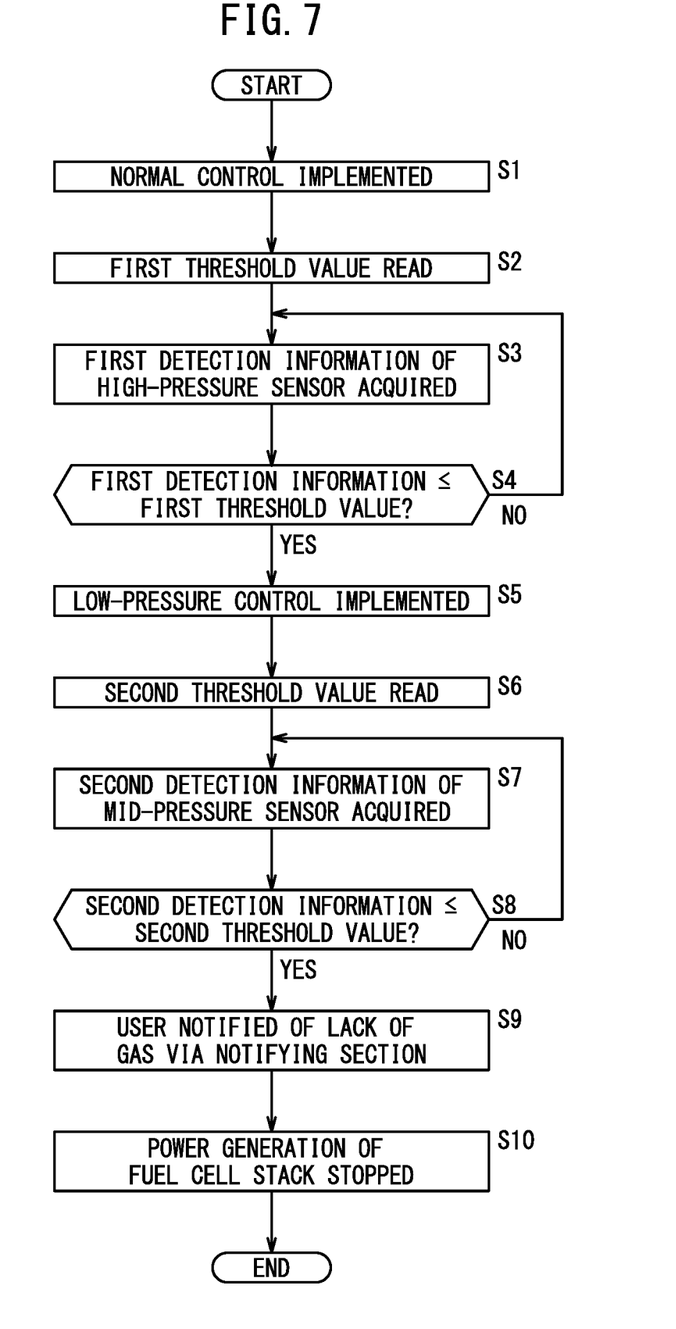
FIG. 7 is a flow chart showing an example of a processing flow of a lack-of-gas determination method of the gas supply system.

If the second detection information I2 exceeds the second threshold value T2 (step S8: NO), the mid-pressure sensor determining section 92 returns to step S7 and then repeats similar processing. On the other hand, if the second detection information I2 is less than or equal to the second threshold value T2 (step S8: YES), the mid-pressure sensor determining section 92 recognizes the lack of fuel gas in the high-pressure tank 14 and moves to step S9. At step S9, the secondary monitoring processing section 90 notifies the user of the fuel cell system 12 that there is a lack of gas, via the notifying section 72.

Furthermore, in response to receiving the lack-of-gas determination result of the gas control ECU 22, the power generation control ECU 24 performs a process of stopping the power generation of the fuel cell stack 16 (step S10). At this time, the gas control ECU 22 stops the supply of fuel gas to the fuel cell stack 16 by, for example, closing the main stop valve 30, or stopping the operation of each device (injector 42, pump 52, and the like) of the gas flow portion 18.

Figure 8:
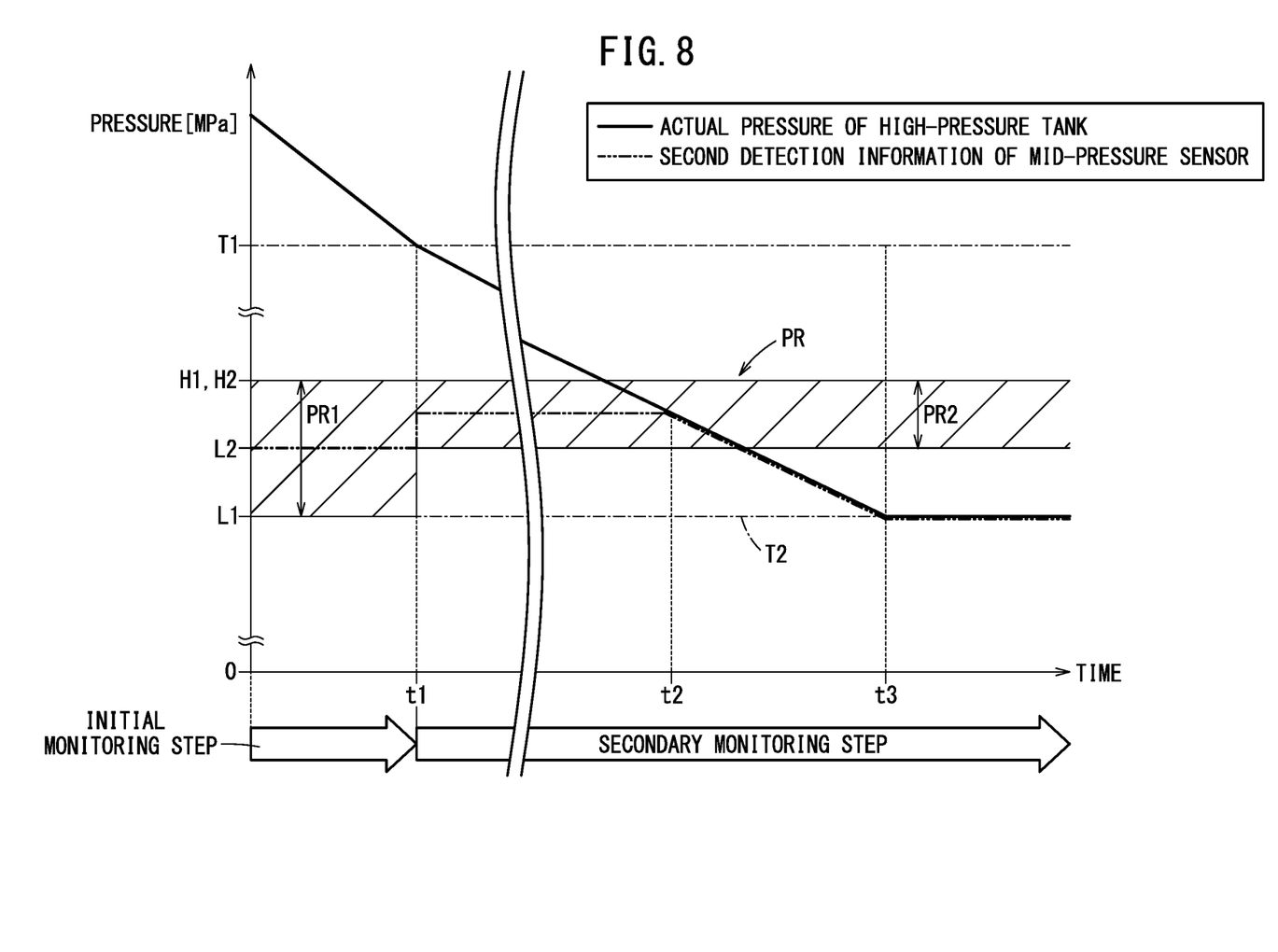
FIG. 8 is a graph for describing the change of pressure in the high-pressure tank over time and the lack-of-gas determination method.

The following describes the pressure change of the fuel gas in the high-pressure tank 14 over time and the control timing up to the lack-of-gas determination, while referencing FIG. 8. After the release of fuel gas from the high-pressure tank 14 has started, the pressure of the fuel gas in the high-pressure tank 14 is monitored based on the first detection information I1 of the high-pressure sensor 62 (initial monitoring step). At this time, the gas control ECU 22 implements the normal control and repeatedly opens and closes the valve of the injector 42 based on the duty ratio corresponding to the target supply amount of the fuel gas (see FIG. 6 as well). Due to this, the regulator 40 reduces the fuel gas pressure to be in the first pressure adjustment range PR1. The pressure of the fuel gas in the high-pressure tank 14 (first detection information I1) gradually decreases until the timing t1 when the first threshold value T1 is reached.

At the timing t1 when the fuel gas pressure becomes less than or equal to the first threshold value T1, the pressure of the fuel gas in the high-pressure tank 14 is monitored using the second detection information I2 of the mid-pressure sensor 64 instead of the first detection information I1 of the high-pressure sensor 62 (secondary monitoring step). Furthermore, the gas control ECU 22 switches from the normal control to the low-pressure control, and repeatedly opens and closes the valve of the injector 42 at the drive interval Tin2 that is longer than the drive interval Tin1 used in the normal control. At this time, if the target supply amount in the low-pressure control is the same as the target supply amount in the normal control, the duty ratio in the low-pressure control is the same as the duty ratio in the normal control. Therefore, it is possible to discharge the fuel gas to the downstream side of the injector 42 without changing the fuel gas flow rate in the low-pressure control from the fuel gas flow rate in the normal control.

Since it takes more time to close the valve than to open the valve in the injector 42, the duty ratio is basically set to be 50% or less (valve-open period To≤valve-closed period Tc). Therefore, even when the drive interval Tin is extended, the time span during which the regulator downstream pressure increases is longer than the time span during which the regulator downstream pressure decreases, and the moving average value MAD2 in the low-pressure control is shifted upward relative to the moving average value MAD1 in the normal control. In this way, the regulator 40 reduces the fuel gas pressure to be within the second pressure adjustment range PR2.

Here, in the gas supply system 10, pulsation is increased in the flow of the fuel gas on the downstream side of the injector 42 due to extension of the drive interval Tin of the injector 42. The fuel cell stack 16 may experience an effect on its power generation quality due to this pulsation of the fuel gas. However, the low-pressure control according to the present embodiment is implemented at a point in time when the pressure of the fuel gas in the high-pressure tank 14 has dropped sufficiently in the initial monitoring step (a timing when the first detection information I1 is less than or equal to the first threshold value T1, that is, a timing when the remaining fuel meter is at E (Empty) or lower). Therefore, with the gas supply system 10, even when the low-pressure control is implemented, it is possible to minimize the effect (noise and the like) on the power generation quality of the fuel cell stack 16 and on the user of the fuel cell system 12.

From the timing t1 onward, if the pressure of the fuel gas in the high-pressure tank 14 is greater than the second pressure adjustment range (PR2), the gas control ECU 22 calculates the approximate median value of the second pressure adjustment range PR2 of the regulator 40, based on the second detection information I2 of the mid-pressure sensor 64. At the timing t2 when the pressure of the fuel gas in the high-pressure tank 14 is less than or equal to the median value of the second pressure adjustment range PR2, the pressure of the fuel gas in the high-pressure tank 14 matches the second detection information I2 of the mid-pressure sensor 64. Accordingly, from the timing t2 onward, the second detection information I2 reflects the pressure of the fuel gas in the high-pressure tank 14 in real time.

According to the low-pressure control, the gas control ECU 22 offsets the second pressure adjustment range PR2 of the regulator 40 relative to a value obtained by adding the positive component (+E2: see FIG. 4B) of the second error range E2 to the second threshold value T2. Therefore, at a timing when the pressure of the fuel gas in the high-pressure tank 14 becomes close to the second threshold value T2, the mid-pressure sensor 64 detects the second detection information I2 (including the second error range E2) that does not have the second pressure adjustment range PR2 of the regulator 40 added thereto. The gas control ECU 22 can accurately monitor whether the pressure of the fuel gas in the high-pressure tank 14 (second detection information I2) has become less than or equal to the second threshold value T2.

At the timing t3 when the second detection information I2 reaches the second threshold value T2, the gas control ECU 22 determines that there is a lack of fuel gas in the high-pressure tank 14. In accordance with this lack-of-gas determination, the power generation control ECU 24 stops the power generation of the fuel cell stack 16. At this time, the gas control ECU 22 stops the release of the fuel gas from the high-pressure tank 14 by stopping the operation of each device. Accordingly, from the timing t3 onward, the mid-pressure sensor 64 detects fuel gas pressure that has levelled off.

The present invention is not limited to the above-described embodiments, and various alternative or additional configurations could be adopted therein without departing from the scope of the present invention. For example, the gas supply system 10 is not limited to being adopted in the fuel cell system 12, and can be adopted in various systems that supply gas from the high-pressure tank 14 to an object that consumes gas.

As another example, the gas supply system 10 may be configured to include a plurality of high-pressure tanks 14, in which case the gas supply paths 32 extending from the connectors 28 of the respective high-pressure tanks 14 should merge on the upstream side of the location where the high-pressure sensor 62 is installed.

The following is a record of the technical concepts and effects that can be understood from the above embodiments.

One aspect of the present invention is a gas supply system 10 comprising a high-pressure tank 14; a regulator 40 that reduces pressure of a gas released from the high-pressure tank 14 to be within a pressure adjustment range PR and causes the gas to flow to a downstream side; an injector 42 that is provided on a downstream side of the regulator 40 and adjusts a flow rate of the gas by repeatedly opening and closing a valve thereof; a first pressure sensor (high-pressure sensor 62) that detects the pressure of the gas on an upstream side of the regulator 40; a second pressure sensor (mid-pressure sensor 64) that detects the pressure of the gas between the regulator 40 and the injector 42; and a control section (gas control ECU 22) that controls operation of the injector 42, wherein the control section is configured to perform an initial monitoring step of comparing first detection information I1 of the first pressure sensor to a first threshold value T1 and, after it is determined that the first detection information I1 has become less than or equal to the first threshold value T1, to perform a secondary monitoring step of comparing second detection information I2 of the second pressure sensor to a second threshold value T2, and the control section causes a valve-open period To and a valve-closed period Tc of the injector 42 in the secondary monitoring step to be longer than the valve-open period To and the valve-closed period Tc of the injector 42 in the initial monitoring step.

The gas supply system 10 described above can cause the gas pressure (regulator downstream pressure) between the regulator 40 and the injector 42 in the secondary monitoring step to be higher than the regulator downstream pressure in the initial monitoring step. Due to this, the control section (gas control ECU 22) can change the pressure adjustment range PR of the regulator 40 and accurately compare the second detection information I2 to the second threshold value T2. That is, by suitably operating the injector 42 according to the situation, the gas supply system 10 can sufficiently depressurize the gas with the regulator 40 and increase the detection accuracy of the pressure sensor 60. Accordingly, with the gas supply system 10, it is possible to reduce the pressure resistance capabilities of devices on the downstream side, thereby promoting a reduction in weight and cost.

Furthermore, the control section (gas control ECU 22) increases the lower limit value of the pressure adjustment range PR by lengthening the valve-open period To and the valve-closed period Tc of the injector 42. Due to this, the gas supply system 10 can more accurately detect the second detection information I2.

Furthermore, the first pressure sensor (high-pressure sensor 62) includes a first error range E1 in the first detection information I1; the second pressure sensor (mid-pressure sensor 64) includes a second error range E2, which is narrower than the first error range E1, in the second detection information I2; and in the initial monitoring step, the control section (gas control ECU 22) causes the pressure adjustment range PR to overlap the second error range E2 defined with the second threshold value T2 as a reference point, and in the secondary monitoring step, the control section offsets the pressure adjustment range PR relative to the second error range E2 defined with the second threshold value T2 as the reference point, by lengthening the valve-open period To and the valve-closed period Tc of the injector 42. Due to this, the gas supply system 10 can use the second detection information I2 in which the effect of the pressure adjustment range PR is suppressed, and can further increase the monitoring accuracy in the secondary monitoring step.

Furthermore, the control section (gas control ECU 22) determines that there is a lack of gas in the high-pressure tank 14 if the second detection information I2 is less than or equal to the second threshold value T2. Due to this, the gas supply system 10 can more accurately determine the lack of gas in the high-pressure tank 14, and can sufficiently use up the gas in the high-pressure tank 14.

Furthermore, the control section (gas control ECU 22) maintains a state in which the valve-open period To and the valve-closed period Tc of the injector 42 are lengthened, until the second detection information I2 becomes less than or equal to the second threshold value T2. Due to this, the control section can stably compare the second detection information I2 to the second threshold value T2 in the secondary monitoring step.

Furthermore, if the second detection information I2 is less than or equal to the second threshold value T2, the control section (gas control ECU 22) stops the release of the gas from the high-pressure tank 14. Due to this, when it has been determined that there is a lack of gas in the high-pressure tank 14, the gas supply system 10 can immediately stop the release of the gas to protect the high-pressure tank 14.

Furthermore, when transitioning from the initial monitoring step to the secondary monitoring step, the control section (gas control ECU 22) extends a drive interval Tin formed of one instance of each of the valve-open period To and the valve-closed period Tc, without changing the duty ratio of the valve-open period To and the valve-closed period Tc. Due to this, the gas supply system 10 can increase the regulator downstream pressure while preserving the flow rate of the gas discharged from the injector 42.

Furthermore, the control section (gas control ECU 22) extends a drive interval Tin2 in the secondary monitoring step in a range of 1.5 times to 2 times a drive interval Tin1 in the initial monitoring step. Due to this, the gas supply system 10 can change the pressure adjustment range PR of the regulator 40 in the secondary monitoring step to be a suitable range.

What is claimed is:

1. A gas supply system comprising:
   a high-pressure tank;
   a regulator configured to reduce pressure of a gas released from the high-pressure tank to be within a pressure adjustment range and cause the gas to flow to a downstream side;
   an injector that is provided on a downstream side of the regulator and is configured to adjust a flow rate of the gas by repeatedly opening and closing a valve thereof;
   a first pressure sensor configured to detect the pressure of the gas on an upstream side of the regulator;
   a second pressure sensor configured to detect the pressure of the gas between the regulator and the injector; and
   a control section configured to control operation of the injector, wherein
   the control section is configured to perform an initial monitoring step of comparing first detection information of the first pressure sensor to a first threshold value and, after it is determined that the first detection information has become less than or equal to the first threshold value, to perform a secondary monitoring step of comparing second detection information of the second pressure sensor to a second threshold value, and
   the control section causes a valve-open period and a valve-closed period of the injector in the secondary monitoring step to be longer than the valve-open period and the valve-closed period of the injector in the initial monitoring step.

2. The gas supply system according to claim 1, wherein the control section increases a lower limit value of the pressure adjustment range by lengthening the valve-open period and the valve-closed period of the injector.

3. The gas supply system according to claim 2, wherein:
   the first pressure sensor includes a first error range in the first detection information;
   the second pressure sensor includes a second error range, which is narrower than the first error range, in the second detection information; and
   in the initial monitoring step, the control section causes the pressure adjustment range to overlap the second error range defined with the second threshold value as a reference point, and in the secondary monitoring step, the control section offsets the pressure adjustment range relative to the second error range defined with the second threshold value as the reference point, by lengthening the valve-open period and the valve-closed period of the injector.

4. The gas supply system according to claim 1, wherein if the second detection information is less than or equal to the second threshold value, the control section determines that there is a lack of gas in the high-pressure tank.

5. The gas supply system according to claim 1, wherein the control section maintains a state in which the valve-open period and the valve-closed period of the injector are lengthened, until the second detection information becomes less than or equal to the second threshold value.

6. The gas supply system according to claim 1, wherein if the second detection information is less than or equal to the second threshold value, the control section stops release of the gas from the high-pressure tank.

7. The gas supply system according to claim 1, wherein when transitioning from the initial monitoring step to the secondary monitoring step, the control section extends a drive interval formed of one instance of each of the valve-open period and the valve-closed period, without changing a duty ratio of the valve-open period and the valve-closed period.

8. The gas supply system according to claim 7, wherein the control section extends the drive interval in the secondary monitoring step in a range of 1.5 times to 2 times the drive interval in the initial monitoring step.

* * * * *